United States Patent
Wang et al.

(10) Patent No.: US 11,757,243 B1
(45) Date of Patent: Sep. 12, 2023

(54) ENERGY-SAVING AND HEAT-DISSIPATING POWER LINE MANUFACTURING METHOD

(71) Applicant: Sichuan Commercial Investment Information Technology Co., Ltd., Chengdu (CN)

(72) Inventors: Yourui Wang, Chengdu (CN); Lin Wan, Chengdu (CN); Xuemei Zhao, Chengdu (CN); Xiaoqiong Yin, Chengdu (CN); Han Deng, Chengdu (CN)

(73) Assignee: Sichuan Commecial Investment Information Technology Co., Ltd., Chengdu (CN)

( * ) Notice: Subject to any disclaimer, the term of this patent is extended or adjusted under 35 U.S.C. 154(b) by 0 days.

(21) Appl. No.: 18/188,955

(22) Filed: Mar. 23, 2023

(30) Foreign Application Priority Data

Mar. 29, 2022 (CN) .......................... 202210318138.0

(51) Int. Cl.
*H01R 43/28* (2006.01)

(52) U.S. Cl.
CPC ......... *H01R 43/28* (2013.01); *Y10T 29/49117* (2015.01)

(58) Field of Classification Search
CPC ...... H01R 43/048; H01R 43/05; H01R 43/00; H01R 43/28; Y10T 156/1313; Y10T 29/5193; Y10T 29/49117
USPC ...... 29/825.33 M, 564.4, 748, 854, 857, 868
See application file for complete search history.

(56) References Cited

U.S. PATENT DOCUMENTS

| | | | | |
|---|---|---|---|---|
| 5,025,549 A | * | 6/1991 | Hornung ............. | H01R 43/052 81/9.51 |
| 6,230,386 B1 | * | 5/2001 | Hasegawa ............. | H01R 43/28 29/33 M |

FOREIGN PATENT DOCUMENTS

| | | |
|---|---|---|
| CN | 202712664 U | 1/2013 |
| CN | 204067820 U | 12/2014 |
| CN | 207290954 | 5/2018 |
| CN | 110265846 | 9/2019 |
| CN | 110602587 | 12/2019 |
| CN | 112171076 | 1/2021 |
| CN | 212769112 U | 3/2021 |
| CN | 113555749 | 10/2021 |
| JP | H07125919 | 5/1995 |

* cited by examiner

*Primary Examiner* — Thiem D Phan
(74) *Attorney, Agent, or Firm* — Andrew D. Fortney; Central California IP Group, P.C.

(57) ABSTRACT

The present invention provides an energy-saving and heat-dissipating power line manufacturing method, and relates to the technical field of line manufacturing, and the specific solution is as follows: two feeding mechanisms are arranged on a feeding table in parallel, and one end of a power line wound on the feeding mechanisms penetrates through a cut-off mechanism through a feeding wheel and is fed into a terminal machine; the cut-off mechanism is started through a handle and cuts off the power line; the two feeding mechanisms are driven by a motor to rotate at the same time, and the winding directions of power lines on the two feeding mechanisms are the same. According to the auxiliary device, the problem that an existing line manufacturing terminal machine is low in working efficiency is solved, and synchronous feeding can be achieved by driving the two feeding bases through one motor.

7 Claims, 4 Drawing Sheets

ENERGY-SAVING AND HEAT-DISSIPATING POWER LINE MANUFACTURING METHOD

REFERENCE TO RELATED APPLICATIONS

This application claims the benefit of Chinese Pat. Appl. No. CN202210318138.0, filed Mar. 29, 2022, incorporated herein by reference in its entirety.

TECHNICAL FIELD

The present invention relates to the technical field of line manufacturing, in particular to an energy-saving and heat-dissipating power line manufacturing method.

BACKGROUND OF THE INVENTION

The terminal line manufacturing machine is composed of a nose and a terminal impact mechanism located on the nose. During line manufacturing, cut power line segments are placed below the top. When the nose moves downwards, the transmission line terminal during the transmission process is pressed onto the thread end, thereby allowing a line source to complete the terminal installation. However, due to the lack of a reasonable line feeding mechanism, the operation during manual line feeding is unstable, and due to the lack of a cut-off mechanism on the line manufacturing terminal machine, this makes it necessary to use other cutting devices to cut the power line before fixing the terminals on the device, affecting work efficiency.

SUMMARY OF THE INVENTION

The present invention provides a multi-functional, energy-saving and heat-dissipating power line manufacturing method, with dual stations for smooth line feeding and a cut-off function, which greatly improves the working efficiency of line manufacturing.

The technical solution of the present invention is an energy-saving and heat-dissipating power line manufacturing method, wherein two feeding mechanisms are arranged on a feeding table in parallel, and one end of a power line wound on the feeding mechanisms penetrates through a cut-off mechanism through a feeding wheel and is fed into a terminal machine; the cut-off mechanism is started through a handle and cuts off the power line; the two feeding mechanisms are driven by a motor to rotate at the same time, and the winding directions of power lines on the two feeding mechanisms are the same.

Preferably, the feeding mechanism comprises a feeding base arranged on the feeding table, and a winding shaft penetrates through the center of the feeding base; the power line is wound on the winding shaft, and a discharge hole facing the feeding wheel is arranged on the feeding base; the feeding wheel is arranged close to the cut-off mechanism.

Preferably, the motor is arranged on the bottom surface of the feeding table, and its output end is connected to one of the winding shafts; a driving wheel and a driven wheel are arranged on the side wall of the output shaft of the motor and the other winding shaft respectively, and the driving wheel and the driven wheel are connected by a conveyor belt.

Preferably, the feeding table is provided with a vertical plate at a position corresponding to the feeding base, and the vertical plate is arranged in the discharge direction of the feeding base; the power line passes between the vertical plate and the feeding wheel, and the vertical plate is provided with a buckling and pressing assembly that can be moved up and down to cover the feeding base.

Preferably, a chute is provided on the side of the vertical plate facing the feeding base, and the buckling and pressing assembly comprises a slide plate in the shape of "¬"; the side of the slide plate facing the chute is provided with a guide block placed in the chute, and the other side of the slide plate is transversely provided with a buckle seat that matches the feeding base; the buckle seat is provided with a circular hole adapted to the winding shaft; a fixed plate is transversely arranged on the vertical plate and the chute, and the fixed plate is connected to the slide plate by a spring.

Preferably, a slide rail with a sliding block is vertically arranged on the side of the vertical plate facing the feeding base, and the buckling and pressing assembly comprises a slide plate in the shape of "¬"; one side of the slide plate is fixed with the sliding block, and the other side of the slide plate is transversely provided with a buckle seat that matches the feeding base; the buckle seat is provided with a circular hole adapted to the winding shaft; a fixed plate is transversely arranged on the vertical plate and the chute, and the fixed plate is connected to the slide plate by a spring.

Preferably, the cut-off mechanism comprises bent plates arranged on the other sides of the two vertical plates, on which a cutting knife is hinged; the two cutting knives are arranged in opposite directions, and a limit post is arranged on the wall surface of one of the cutting knives; when the cutting knife without a limit post is rotated towards the other cutting knife until it strikes the limit post, pressure is applied to the limit post and the cutting knife installed with the limit post rotates downwards simultaneously, and a cutting table with a top surface being an inclined surface is arranged on the side wall of the feeding table and below the cutting knife.

Preferably, a hand slot corresponding to the vertical plate is provided on the feeding table, and the hand slot is provided with a key electrically connected to the motor; the inner wall of the hand slot is transversely provided with a through hole that successively penetrates through the feeding table and the cutting table, and the hand slot is movably connected with the handle through a rotating shaft; a steel wire that penetrates through the through hole is connected between the handle and the cutting knife without a limit post, and a bending spring is connected between the cutting knife and the bent plate to rotate downwards and then automatically rotate upwards to reset.

Preferably, the bottom surface of the feeding table is provided with a gas collecting hood, and the motor is located inside the gas collecting hood; a heat-dissipating fan is provided in the gas collecting hood, close to the motor, and both ends of the heat-dissipating fan are provided with heat-dissipating blades; one group of the heat-dissipating blades is arranged close to the motor, and the other group of heat-dissipating blades corresponds to the discharge end of the feeding table; a gas seat connected to the heat-dissipating blade correspondingly arranged at the discharge end of the feeding table is provided at the discharge end of the feeding table.

Preferably, the gas seat is arranged at the discharge end of the feeding table, and several vent holes connected to the heat-dissipating blade at this end is provided on the gas seat.

Compared with the prior art, the beneficial effects of the present invention include: the feeding table is provided with two buckling and pressing type feeding bases, which can transport power line materials by means of their rotation actions. Since there are two feeding bases, the output increases. When the feeding base is used with the terminal machine to transport materials, it can serve two terminal machines or two line manufacturing stations of the same terminal machine simultaneously, thereby improving the working efficiency. Synchronous feeding can be achieved by driving the two feeding bases through one motor, saving both the number of motors and electrical energy. The motor drive structure is installed at the bottom of the feeding table, and feeding bases are installed on top of the feeding table, symmetrically distributed, with a compact structure. Moreover, the buckling and pressing structure on the two feeding bases is installed on the top of the slide rail to replace the wire roller. When wire rollers are replaced, only the buckle seats need to be lifted upwards through the sliding rails, and operation is convenient.

DETAILED DESCRIPTION OF THE PREFERRED EMBODIMENTS

Figure 1:
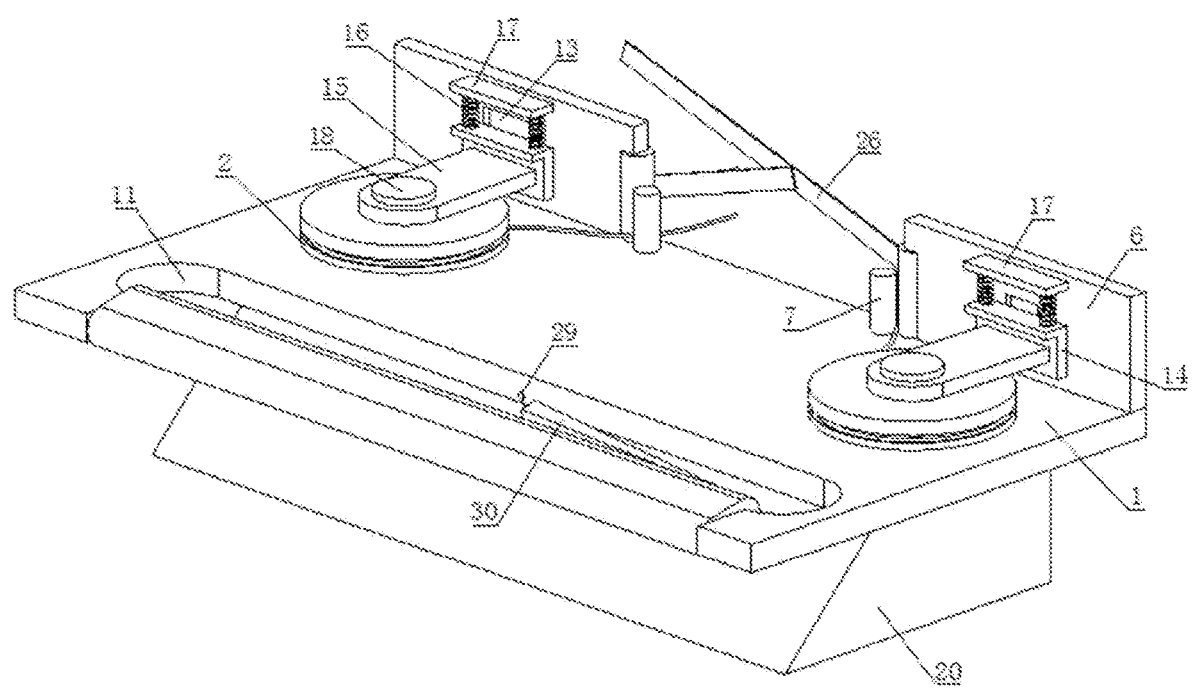
FIG. 1 is a schematic diagram of the overall structure of the present invention.
Figure 2:
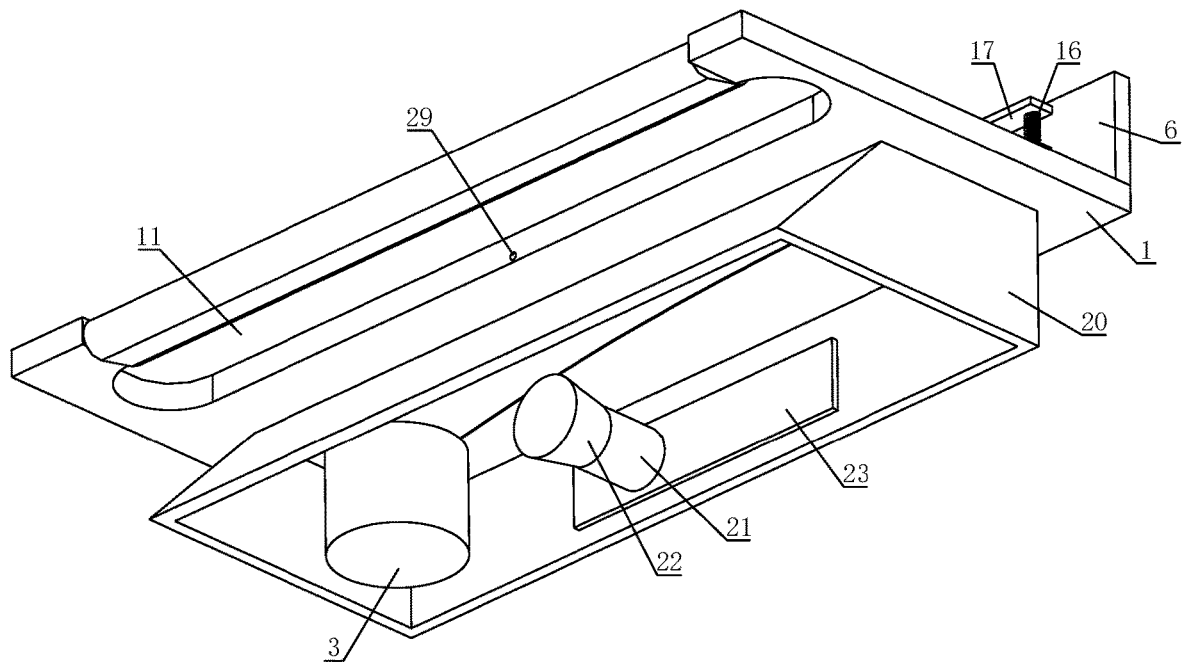
FIG. 2 is a schematic diagram of the bottom view angle of the present invention derived from FIG. 1.

The technical solutions of the present invention patent will be described clearly and completely in connection with drawings in the following paragraphs. Obviously, the described embodiments are part, but not all, of the embodiments of the present invention. All other embodiments obtained by those skilled in the art without inventive step based on the embodiments of the present invention are within the scope set forth in the present invention.

As shown in FIG. 1~FIG. 5.

This embodiment provides an energy-saving and heat-dissipating power line manufacturing method, wherein two feeding mechanisms are arranged on a feeding table 1 in parallel, and one end of a power line wound on the feeding mechanisms penetrates through a cut-off mechanism through a feeding wheel 7 and is fed into a terminal machine; the cut-off mechanism is started through a handle 30 and cuts off the power line; the two feeding mechanisms are driven by a motor 3 to rotate at the same time, and the winding directions of power lines on the two feeding mechanisms are the same.

Specifically: the feeding mechanism comprises a feeding base 2 arranged on the feeding table 1, and the feeding base 2 is fixed with the feeding table 1 by a bearing; a winding shaft 18 penetrates through the center of the feeding base 2; the power line is wound on the winding shaft 18, and the winding shaft 18 is fixed in the bearing; its both ends extend beyond the top and the bottom of the feeding table 1, and a discharge hole 8 facing the feeding wheel 7 is arranged on the feeding base 2; the feeding wheel 7 is arranged close to the cut-off mechanism.

Furthermore, the bottom of the feeding table 1 is provided with a sink 4 connected to the bottoms of the two feeding bases 2; the motor 3 is arranged in the sink 4 and the output end is connected to one of the winding shafts 18. At the meantime, a driving wheel 31 and a driven wheel 32 are arranged on the side wall of the output shaft of the motor 3 and the other winding shaft respectively, and the driving wheel 31 and the driven wheel 32 are connected by a conveyor belt 10, thereby driving two feeding mechanism to feed materials by a motor 3.

Furthermore, the feeding table 1 is provided with a vertical plate 6 at a position corresponding to the feeding base 2, and the vertical plate 6 is arranged in the discharge direction of the feeding base 2; the power line passes between the vertical plate 6 and the feeding wheel 7, and the vertical plate 6 is provided with a buckling and pressing assembly that can be moved up and down to cover the feeding base 2. In order to avoid abrasion of the power line, a rubber pad is provided on the side wall corresponding to the vertical plate 6 and the feeding wheel 7.

Furthermore, a hand slot 11 corresponding to the vertical plate 6 is provided on the feeding table 1, and the hand slot 11 is provided with a key 12 electrically connected to the motor 3; the inner wall of the hand slot 11 is transversely provided with a through hole 29 that successively penetrates through the feeding table 1 and the cutting table 28, and the hand slot 11 is movably connected with the handle 30 through a rotating shaft; a steel wire 33 that penetrates through the through hole 29 is connected between the handle 30 and the cutting knife 26 without a limit post 27, and a bending spring 5 is connected between the cutting knife 26 and the bent plate 25 to rotate downwards and then automatically rotate upwards to reset.

In practical applications, after the output end of the power line enters the line manufacturing device and is fixed to the connecting terminal by the nose, the handle 30 is grasped to pull it towards the human side. At the same time, the steel wire 33 will also be pulled, and the cutting knife 26 is enabled to rotate downwards by means of its pulling action, until its bottom end is punched onto the cutting table 28. From then on, the power lines passing through the cutting table 28 can be cut off and blanked. Moreover, a bending spring 5 is connected between the cutting knife 26 and the bent plate 25 for rotating it downwards and then automatically rotating it upwards to reset it, with reasonable structure.

In this embodiment, the line manufacturing device is used with the line manufacturing machine by placing it near the nose of the line manufacturing machine. The operator sleeves two bundles of power lines on the winding shaft 18 of the feeding base 2, and then buckles the buckling and pressing assembly onto the feeding base 2. The installation of the power line is completed. After starting the key 12, the winding shaft 18 rotates with the drive of the motor 3. Under the action of the driving pulley 31, the driven pulley 32, and the conveyor belt 10, the two feeding bases 2 are synchronously rotated, and the power line is enabled to pass through the discharge hole 8 and enter the feeding wheel 7 by means of its rotation action. Under the rolling feeding of the feeding wheel 7, the power line enters the terminal machine. The line manufacturing nose on the terminal machine presses the terminal onto the thread end, completing one line manufacturing operation. It can be seen from the structure, since the device is provided with two feeding bases 2 for feeding the power lines, and can be driven by a motor 3 to simultaneously complete the feeding operation. It can convey the power lines to two line manufacturing machines simultaneously, improving the working efficiency. Moreover, in the above-mentioned belt conveying mode, the two feeding bases 2 can be able to feed simultaneously, not only making the device simple in structure, but also reducing the power consumption.

Figure 5:
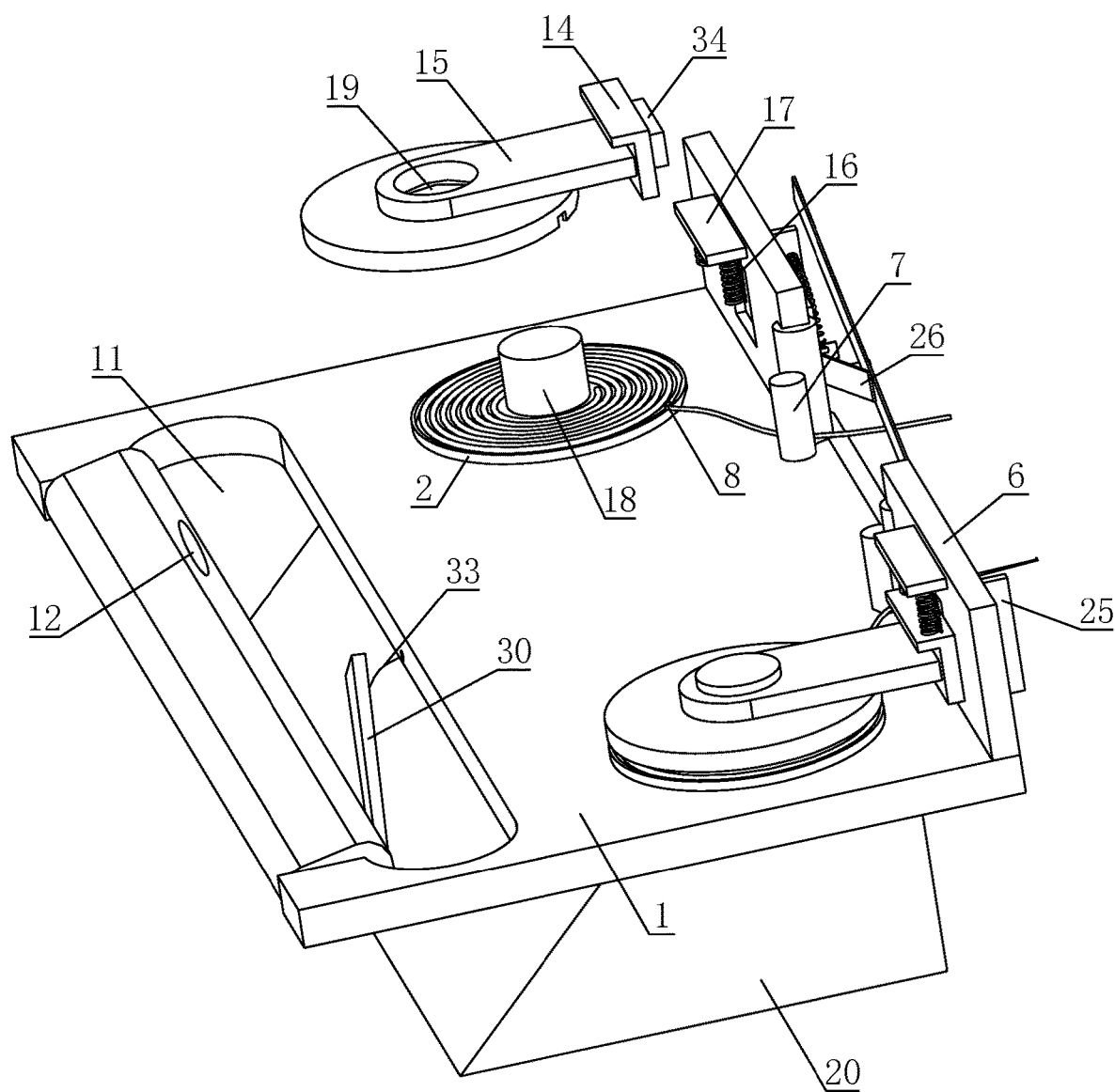
FIG. 5 is a schematic diagram of the structure of the buckling and pressing assembly in the present invention after disassembly;
Reference numerals: feeding table 1, feeding base 2, motor 3, sink 4, bending spring 5, vertical plate 6, feeding wheel 7, discharge hole 8, conveyor belt 10, hand slot 11, key 12, chute 13, slide plate 14, buckle seat 15, spring 16, fixed plate 17, winding shaft 18, circular hole 19, gas collecting hood 20, heat-dissipating fan 21, heat-dissipating blade 22, gas seat 23, vent hole 24, bent plate 25, cutting knife 26, limit post 27, cutting table 28, through hole 29, handle 30, driving wheel 31, driven wheel 32, steel wire 33, guide block 34.

As shown in FIGS. 1 and 5, a chute 13 is provided on the side of the vertical plate 6 facing the feeding base 2, and the buckling and pressing assembly comprises a slide plate 14 in the shape of "¬"; the side of the slide plate 14 facing the chute 13 is provided with a guide block 34 placed in the chute 13, and the other side of the slide plate 14 is transversely provided with a buckle seat 15 that matches the feeding base 2; the buckle seat 15 has a cover at the bottom, which can cover the power line. The buckle seat 15 is provided with a circular hole 19 adapted to the winding shaft 18, and the winding shaft 18 passes through the circular hole 19; a fixed plate 17 is transversely arranged on the vertical plate 6 and above the chute 13, and the fixed plate 17 is connected to the slide plate 14 by a spring 16, thereby allowing the whole buckling and pressing assembly to move up and down, and reset under the action of the spring 16. After the power line roller is sleeved on the winding shaft 18 and located on the feeding base 2, the buckle seat 15 is then sleeved on the feeding base 2 through the circular hole 19 to limit the power line to the feeding base 2. The outgoing material of the power line is introduced from the discharge hole 8 to the feeding wheel 7, and the power line is introduced to the line manufacturing device through the feeding base 2 as the winding shaft 18 rotates.

There is another setting method for the slide plate 14 and the vertical plate 6: a slide rail with a sliding block is vertically arranged on the side of the vertical plate 6 facing the feeding base 2; the buckling and pressing assembly comprises a slide plate 14 in the shape of "¬", and one side of the slide plate 14 is fixed with the sliding block; the other side of the slide plate 14 is transversely provided with a buckle seat 15 that matches the feeding base 2; the buckle seat 15 is provided with a circular hole 19 adapted to the winding shaft 18; a fixed plate 17 is transversely arranged on the vertical plate 6 and above the chute 13, and the fixed plate 17 is connected to the slide plate 14 by a spring 16.

Further preferably, the bottom surface of the feeding table 1 is provided with a gas collecting hood 20, and the motor 3 is located inside the gas collecting hood 20; a heat-dissipating fan 21 is provided in the gas collecting hood 20, close to the motor 3, and both ends of the heat-dissipating fan 21 are provided with heat-dissipating blades 22; one group of the heat-dissipating blades 22 is arranged close to the motor 3, and the other group of heat-dissipating blades corresponds to the discharge end of the feeding table 1; the discharge end of the feeding table 1 is provided with a gas seat 23 connected to the heat-dissipating blade 22 at this end; one group of heat-dissipating blades 22 dissipates the heat generated by the motor 3, while the other group of heat-dissipating blades 22 blows the heat-dissipating gas through the gas seat 23 with a vent hole 24 to the line manufacturing device, allowing the nose of the line manufacturing device to dissipate the heat generated when the thread end is fixed to the terminal, thus improving the functionality.

Figure 3:
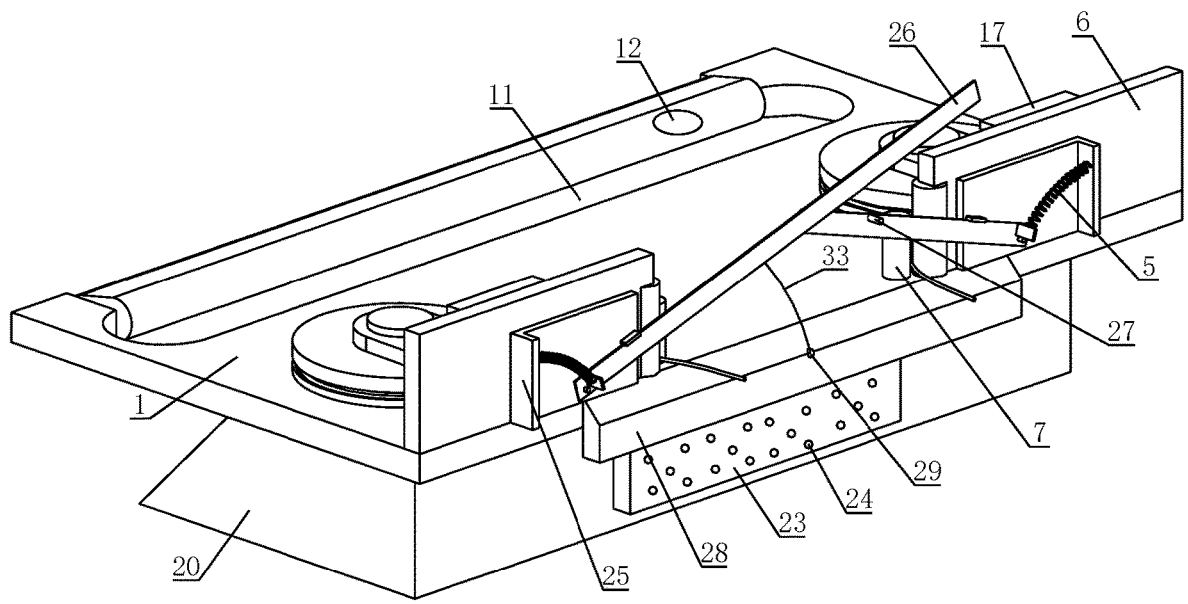
FIG. 3 is a schematic diagram of the rear view angle of the present invention derived from FIG. 1.
Figure 4:
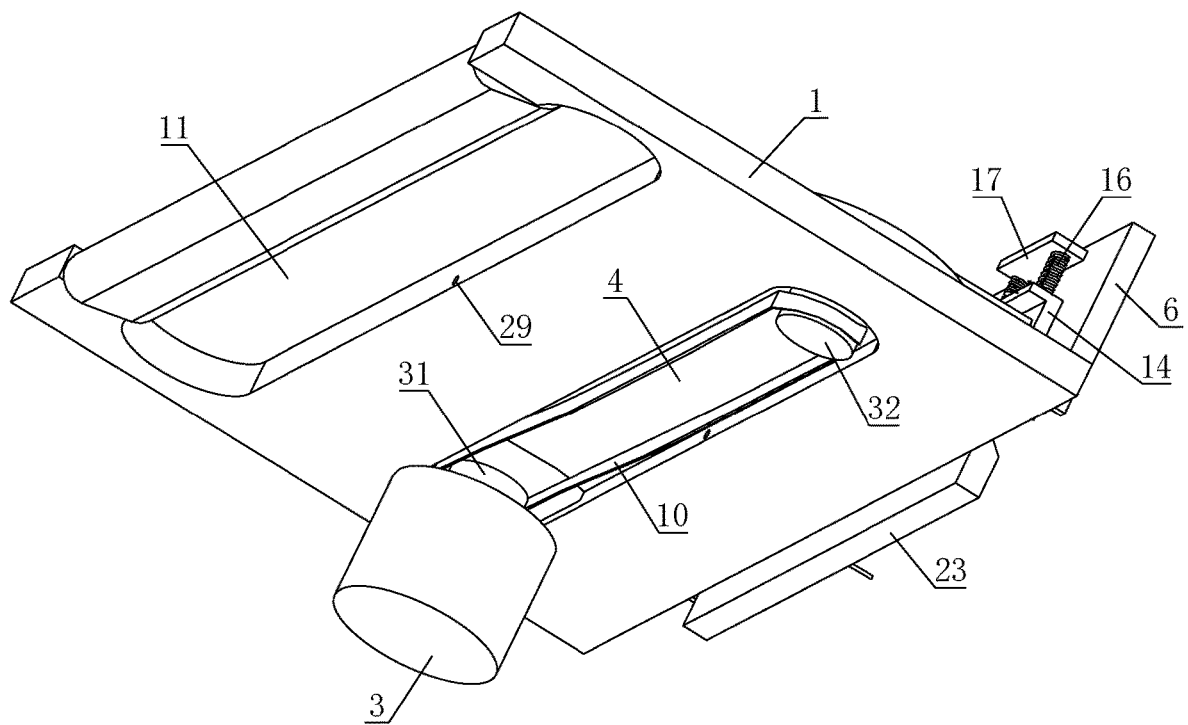
FIG. 4 is a schematic diagram of viewing the sink and the belt conveying mechanism in the sink from the bottom perspective of the present invention and after the removal of the gas collecting hood.

In another embodiment, as shown in FIG. 1 and FIG. 3, the cut-off mechanism comprises bent plates 25 arranged on the other sides of the two vertical plates 6, on which a cutting knife 26 is hinged; the two cutting knives 26 are arranged in opposite directions and can rotate downwards simultaneously; a limit post 27 is arranged on the side of one of the cutting knives 26, and a cutting table 28 with a top surface being an inclined surface is arranged on the side wall of the feeding table 1 and below the cutting knife 26; when the cutting knife 26 without a limit post 27 is rotated towards the other cutting knife 26 until it strikes the limit post 27, pressure is applied to the limit post 27 and the cutting knife 26 installed with the limit post 27 rotates downwards simultaneously. When the two cutting knives 26 rotate downwards, the cutting operation can be completed using the power line segment with the connecting terminal fixed on the nose. Since two power lines can be manufactured at one time, when the two interlocking cutting knives 26 are set to operate simultaneously, two power line segments with connecting terminals will be cut at one time, making the device achieve the goal of multi-station feeding and multi-station cutting and blanking, greatly improving the working efficiency.

In order to facilitate the operation of the cutting function, as shown in FIG. 5, a through hole 29 is also provided from one end of the hand slot 11 to the discharge end of the feeding table 1. The hand slot 11 is movably connected with the handle 30 close to the through hole 29 through a rotating shaft, and a steel wire 33 that penetrates through the through hole 29 is connected between the handle 30 and the cutting knife 26.

The purpose, technical solution and beneficial effects of the present invention have been further described in detail by the above specific embodiments. It should be understood that, the above descriptions are merely specific embodiments of the present invention, and are not intended to limit the scope of protection of the present invention. In particular, for those skilled in the art, any modification, equivalent replacement and improvement made within the spirit and rule of the present invention shall be incorporated in the scope of protection of the present invention.

What is claimed:

1. An energy-saving and heat-dissipating power line manufacturing method, wherein two feeding mechanisms are arranged on a feeding table in parallel, and one end of a power line wound on the feeding mechanisms penetrates through a cut-off mechanism through a feeding wheel and is fed into a terminal machine; the cut-off mechanism is started through a handle and cuts off the power line; the two feeding mechanisms are driven by a motor to rotate at the same time, and the winding directions of power lines on the two feeding mechanisms are the same;

the feeding mechanism comprises a feeding base arranged on the feeding table, and a winding shaft penetrates through the center of the feeding base; the power line is wound on the winding shaft, and a discharge hole facing the feeding wheel is arranged on the feeding base; the feeding wheel is arranged close to the cut-off mechanism;

the feeding table is provided with a vertical plate at a position corresponding to the feeding base, and the vertical plate is arranged in the discharge direction of the feeding base; the power line passes between the vertical plate and the feeding wheel, and the vertical plate is provided with a buckling and pressing assembly that can be moved up and down to cover the feeding base;

the cut-off mechanism comprises bent plates arranged on the other sides of the two vertical plates, on which a cutting knife is hinged; the two cutting knives are arranged in opposite directions, and a limit post is arranged on the wall surface of one of the cutting knives; a cutting table with a top surface being an inclined surface is arranged on the side wall of the feeding table and below the cutting knife; when the cutting knife without a limit post is rotated towards the other cutting knife until it strikes the limit post, pressure is applied to the limit post and the cutting knife installed with the limit post rotates downwards simultaneously.

2. The energy-saving and heat-dissipating power line manufacturing method according to claim 1, wherein the motor is arranged on the bottom surface of the feeding table, and its output end is connected to one of the winding shafts; a driving wheel and a driven wheel are arranged on the side wall of the output shaft of the motor and the other winding shaft, respectively, and the driving wheel and the driven wheel are connected by a conveyor belt.

3. The energy-saving and heat-dissipating power line manufacturing method according to claim 1, wherein a chute is provided on the side of the vertical plate facing the feeding base, and the buckling and pressing assembly comprises a slide plate in the shape of "¬", the side of the slide plate facing the chute is provided with a guide block placed in the chute, and the other side of the slide plate is transversely provided with a buckle seat that matches the feeding base; the buckle seat is provided with a circular hole adapted to the winding shaft; a fixed plate is transversely arranged on the vertical plate and above the chute, and the fixed plate is connected to the slide plate by a spring.

4. The energy-saving and heat-dissipating power line manufacturing method according to claim 3, wherein a slide rail with a sliding block is vertically arranged on the side of the vertical plate facing the feeding base; the buckling and pressing assembly comprises a slide plate in the shape of "¬", and one side of the slide plate is fixed with the sliding block; the other side of the slide plate is transversely provided with a buckle seat that matches the feeding base; the buckle seat is provided with a circular hole adapted to the winding shaft; a fixed plate is transversely arranged on the vertical plate and above the chute, and the fixed plate is connected to the slide plate by a spring.

5. The energy-saving and heat-dissipating power line manufacturing method according to claim 1, wherein a hand slot corresponding to the vertical plate is provided on the feeding table, and the hand slot is provided with a key electrically connected to the motor; the inner wall of the hand slot is transversely provided with a through hole that successively penetrates through the feeding table and the cutting table, and the hand slot is movably connected with the handle through a rotating shaft; a steel wire that penetrates through the through hole is connected between the handle and the cutting knife without a limit post, and a bending spring is connected between the cutting knife and the bent plate to rotate downwards and then automatically rotate upwards to reset.

6. The energy-saving and heat-dissipating power line manufacturing method according to claim 1, wherein the bottom surface of the feeding table is provided with a gas collecting hood, and the motor is located inside the gas collecting hood; a heat-dissipating fan is provided in the gas collecting hood, close to the motor, and both ends of the heat-dissipating fan are provided with heat-dissipating blades; one group of the heat-dissipating blades is arranged close to the motor, and the other group of heat-dissipating blades corresponds to the discharge end of the feeding table; a gas seat connected to the heat-dissipating blade correspondingly arranged at the discharge end of the feeding table is provided at the discharge end of the feeding table.

7. The energy-saving and heat-dissipating power line manufacturing method according to claim 6, wherein the gas seat is arranged at the discharge end of the feeding table, and several vent holes connected to the heat-dissipating blade correspondingly arranged at the discharge end of the feeding table is provided on the gas seat.

\* \* \* \* \*